(12) United States Patent
Gataric et al.

(10) Patent No.: US 9,257,838 B2
(45) Date of Patent: Feb. 9, 2016

(54) CIRCUIT AND METHOD FOR ALLOCATING POWER AMONG GENERATORS

(71) Applicant: GE AVIATION SYSTEMS LLC, Grand Rapids, MI (US)

(72) Inventors: Slobodan Gataric, Xenia, OH (US); Jinhui Zhang, Dayton, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 544 days.

(21) Appl. No.: 13/716,426

(22) Filed: Dec. 17, 2012

(65) Prior Publication Data

US 2014/0167516 A1 Jun. 19, 2014

(51) Int. Cl.
*H02J 1/00* (2006.01)
*H02J 1/12* (2006.01)

(52) U.S. Cl.
CPC .............. *H02J 1/12* (2013.01); *Y10T 307/718* (2015.04)

(58) Field of Classification Search
USPC ........................................................ 307/45
See application file for complete search history.

(56) References Cited

U.S. PATENT DOCUMENTS

| | | | |
|---|---|---|---|
| 2,360,102 A | 10/1944 | Bowman | |
| 2,636,132 A | 4/1953 | Stineman et al. | |
| 2,802,952 A | 8/1957 | Fairweather | |
| 3,665,203 A * | 5/1972 | Barnett | H02J 1/10 307/57 |
| 4,967,097 A * | 10/1990 | Mehl | 307/84 |
| 7,936,086 B2 * | 5/2011 | Yue | H02J 1/10 307/10.1 |
| 2008/0129050 A1* | 6/2008 | Guey | F03D 9/002 290/43 |
| 2008/0246338 A1* | 10/2008 | Donnelly | B60L 11/02 307/54 |
| 2009/0224599 A1 | 9/2009 | Yue et al. | |
| 2009/0261586 A1 | 10/2009 | Maddali et al. | |
| 2011/0001359 A1* | 1/2011 | Moon | H02J 1/102 307/43 |
| 2014/0167516 A1* | 6/2014 | Gataric | H02J 1/12 307/84 |

OTHER PUBLICATIONS

GB Combined Search and Examination Report dated Feb. 24, 2014 issued in connection with corresponding GB Application No. GB1322058.7.
French Search Report and Written Opinion issued in connection with corresponding FR Application No. 1361991 on May 29, 2015.

* cited by examiner

*Primary Examiner* — Ronald W Leja
(74) *Attorney, Agent, or Firm* — GE Global Patent Operation; William S. Munnerlyn

(57) ABSTRACT

A circuit and method for allocating power among two or more generators to a single load on a shared bus includes a sharing regulator and a feedback loop for each generator. A digital share command input and current in the feedback loops will cause the sharing regulators to alter the power of the generators at the generator outputs, thereby allocating the load on the shared bus according to the share command, and confirming the allocation of power at the outputs.

17 Claims, 3 Drawing Sheets

CIRCUIT AND METHOD FOR ALLOCATING POWER AMONG GENERATORS

BACKGROUND OF THE INVENTION

Turbine engines, and particularly gas turbine engines, also known as combustion turbine engines, are rotary engines that extract energy from a flow of combusted gases passing through the engine onto a multitude of turbine blades. Gas turbine engines have been used for land and nautical locomotion and power generation, but are also often used for aeronautical applications such as for airplanes, including helicopters. In airplanes, gas turbine engines are used for propulsion of the aircraft.

Gas turbine engines can have two or more spools, including a low pressure (LP) spool that provides a significant fraction of the overall propulsion system thrust, and a high pressure (HP) spool that drives one or more compressors and produces additional thrust by directing exhaust products in an aft direction.

Gas turbine engines also usually power a number of different accessories such as generators, starter/generators, permanent magnet alternators (PMA), fuel pumps, and hydraulic pumps, e.g., equipment for functions other than propulsion. For example, contemporary aircraft need electrical power for avionics, motors, and other electric equipment. A generator coupled with a gas turbine engine will convert the mechanical power of the engine into electrical energy needed to power accessories. If one generator is connected to the LP spool of a turbine engine and the other generator connected to the HP spool of the turbine engine and the output of both generators goes to the same bus, it may be advantageous to allocate power between the generators.

BRIEF DESCRIPTION OF THE INVENTION

One aspect of the invention is directed to a circuit for allocating power among at least two direct current (DC) generators to a single load on a shared DC bus. The circuit includes a first generator and a second generator parallel to each other, a first sharing regulator serially connected to the first generator and a second sharing regulator serially connected to the second generator. A first filter is serially connected between a first generator output and the DC bus and a second filter is serially connected between a second generator output and the DC bus. A digital input is provided to each of the first and second sharing regulators. A first current feedback loop is disposed between an output of the first filter and an input of the first sharing regulator and a second current feedback loop is disposed between an output of the second filter and an input of the second sharing regulator. Thus, a share command at the digital input and current in the first and second current feedback loops will cause the first and second sharing regulators to alter the power of the first and second generators at the first and second generator outputs, thereby allocating the load on the DC bus according to the share command.

Another aspect of the invention is directed to a method for allocating power among at least two DC generators to a single load on a shared DC bus. The method includes providing a sharing regulator and a current feedback loop for each of the at least two DC generators, generating a digital input to each sharing regulator wherein the digital input represents a selected allocation among the at least two DC generators, sending a reference voltage signal from each sharing regulator to a respective one of the at least two DC generators to alter the power at the output of each generator, and confirming the allocation of power at the outputs, by way of current, in the respective current feedback loop.

DESCRIPTION OF EMBODIMENTS OF THE INVENTION

The described embodiments of the present invention are directed to allocating power among two or more generators, preferably ones that extract mechanical power from a turbine engine such as an aircraft engine, and more particularly to an electrical circuit which enables control of the allocation of electrical power. It will be understood, however, that the invention is not so limited and has general application to electrical power system architectures in non-aircraft turbine applications, such as other mobile applications and non-mobile industrial, commercial, and residential applications.

Figure 1:
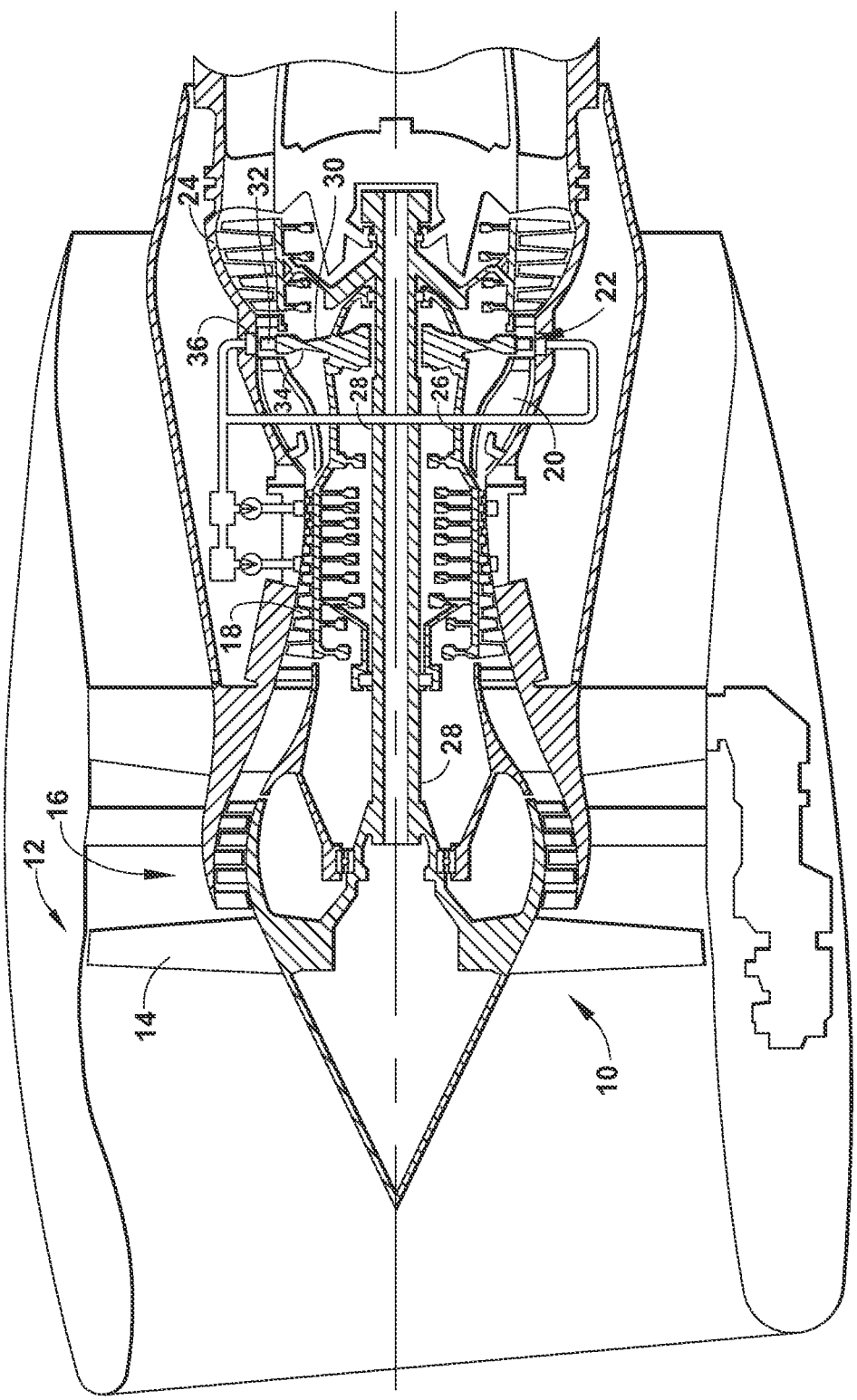
FIG. 1 is a schematic cross-sectional diagram of a gas turbine engine for an aircraft.

FIG. 1 is a schematic cross-sectional diagram of a gas turbine engine 10 for an aircraft as an example of the environment where embodiments of the invention will prove advantageous. Engine 10 includes, in downstream serial flow relationship, a fan section 12 including a fan 14, a booster or low pressure (LP) compressor 16, a high pressure (HP) compressor 18, a combustion section 20, a HP turbine 22, and a LP turbine 24. A HP shaft or spool 26 drivingly connects HP turbine 22 to HP compressor 18 and a LP shaft or spool 28 drivingly connects LP turbine 24 to LP compressor 16 and fan 14. HP turbine 22 includes an HP turbine rotor 30 having turbine blades 32 mounted at a periphery of rotor 30. Blades 32 extend radially outwardly from blade platforms 34 to radially outer blade tips 36.

Figure 2:
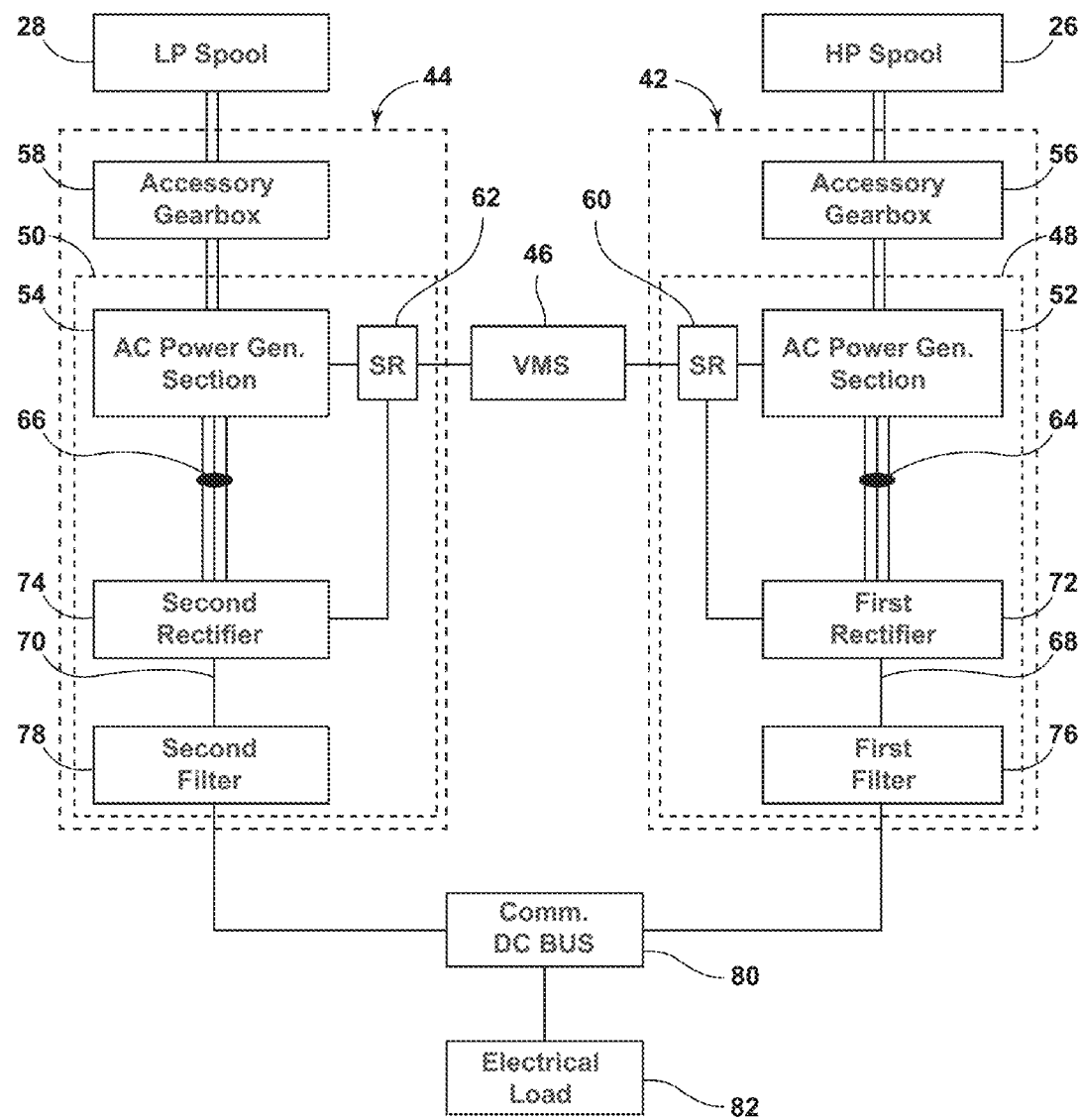
FIG. 2 is a schematic block diagram of an electrical power system architecture for the gas turbine engine of FIG. 1, the system architecture having a circuit for allocating power among two generators in accordance with a first embodiment of the invention.

FIG. 2 is a schematic block diagram of an electrical power system architecture 40 according to one embodiment of the invention. The system architecture 40 includes multiple generator systems, shown herein as including at least a first generator system 42 and a second generator system 44 in parallel arrangement, configured to share a common output DC electrical bus 80. The first and second generator systems 42, 44 may be substantially identical; however dislike generator systems are also envisioned. Each of the generator systems 42, 44 are configured to produce three phase alternating current (AC) power within the electrical specifications of the aircraft. For example, the current embodiment operates under the MIL-STD-544F standard, requiring direct current (DC) normal operating characteristics for a 254 V DC system to operate between 250.0 V to 268.0 V, as provided at the input terminals of the electric utilization equipment of an aircraft.

The system architecture further includes a vehicle management system (VMS) 46 configured to provide a digital signal to each of the generator systems 42, 44. The VMS 46 is shown apart from both generator systems 42, 44, and is ideally positioned with other aircraft electronic components. However, alternate placements of the VMS 46 may take into account design considerations and may be included within the gas turbine engine 10, within a generator system 42, 44, or any other suitable location.

The first generator system 42 connects to the HP spool 26 of the gas turbine engine 10 shown in FIG. 1. Similarly, the second generator system 44 connects to the LP spool 28 of the gas turbine engine 10. The first generator system 42 shown herein uses mechanical power provided by HP spool 26 as the driving force for electrical power generation. Although the first generator system 42 is shown coupled with the HP spool 26, and the second generator system 44 is shown coupled with the LP spool 28, it is envisioned that any generator/spool combination may function similarly, e.g., the first generator system 42 may be coupled with the LP spool 28, and so on. Moreover, the system architecture 40 could also be implemented on an engine having more than two generators or more than two spools, such as a 3-spool/3-generator engine having an intermediate pressure spool in addition to the HP and LP spools 26, 28. Furthermore, the generators systems 42, 44 do not need to reside within the same engine 10. For example, three generator systems may be coupled to HP or LP spools 26, 28 in two different engines 10, so long as they are each configured to share a common output power bus.

The first generator system 42 comprises a first generator 48 having an AC power generation section 52 such as a conventional alternator or induction generator. As illustrated, the HP spool 26 can be operably coupled with the first generator 48 by an HP drive assembly, as needed, having an input mechanically coupled to the HP spool 26 and an output mechanically coupled to the AC power generation section 52. One embodiment of the HP drive assembly is an accessory gearbox 56. Within the accessory gearbox 56, power may also be transferred to other engine accessories.

The first generator 48 further comprises a serially connected first sharing regulator 60, having an electrical input coupled with the VMS 46 and electrical outputs coupled with both the AC power generation section 52 and a first rectifier device 72. Although the illustrated embodiment shows the positioning of the first sharing regulator 60 within the first generator 48, alternate positioning is envisioned.

The AC power generation section 52 of the first generator 48 converts mechanical power supplied by the HP spool 26 into electrical power and produces a variable frequency power output, illustrated having three phase output AC cables 64. The AC cables 64 from the first generator 48 are electrically connected to the first rectifier device 72 for converting the AC power output to a DC power output 68. In this embodiment, the first rectifier device 72 is an active rectifier, wherein the power flow between the AC side and DC side is bidirectional. Alternate embodiments are envisioned where the first rectifier device 72 is a passive rectifier, wherein the power flow is unidirectional from AC to DC.

The second generator system 44 comprises a second generator 50 having an AC power generation section 54. As illustrated, The LP spool 28 can be operably coupled with the second generator 50 by an LP drive assembly, as needed, having an input mechanically coupled to the LP spool 28 and an output mechanically coupled to the AC power generation section 54. One embodiment of the LP drive assembly is an accessory gearbox 58. Within the accessory gearbox 56, power may also be transferred to other engine accessories.

The second generator 50 further comprises a serially connected second sharing regulator 62, having an electrical input coupled with the VMS 46 and electrical outputs coupled with both the AC power generation section 54 and a second rectifier device 74. Although the illustrated embodiment shows the positioning of the second sharing regulator 62 within the second generator 50, alternate positioning is envisioned.

The AC power generation section 54 of the second generator 50 converts mechanical power supplied by the LP spool 28 into electrical power and produces a variable frequency power output, illustrated having three phase output AC cables 66. The AC cables 66 from the second generator 50 are electrically connected to the second rectifier device 74 for converting the AC power output to a DC power output 70. In this embodiment, the second rectifier device 74 is an active rectifier, wherein power flow between the AC side and DC side is bidirectional. Alternate embodiments are envisioned where the second rectifier device 74 is a passive rectifier, wherein the power flow is unidirectional from AC to DC.

The DC power output 68 from the first generator 48 is supplied to a serially connected first filter 76 for evening out the voltage harmonics before being supplied to the common DC electrical bus 80. Similarly, the DC power output 70 from the second generator 50 is supplied to a serially connected second filter 78 for evening out the voltage harmonics before being supplied to the common DC electrical bus 80. The common DC electrical bus 80 is configured to supply DC power to aircraft electrical loads 82 that require a DC power supply.

In operation, with the gas turbine engine 10 running, the HP turbine 22 rotates the HP spool 26 and the LP turbine 24 rotates the LP spool. The accessory gearbox 56 is driven by the rotating HP spool 26, and transmits mechanical power from the HP spool 26 to the first generator 48. The first generator 48 converts mechanical power supplied by the HP spool 26 into electrical power and produces the DC power output 68 in response to the signal of the first sharing regulator 60. The accessory gearbox 58 is driven by the rotating LP spool 28, and transmits mechanical power from the LP spool 28 to the second generator 50. The second generator 50 converts the mechanical power supplied by the LP spool 28 into electrical power and produces the DC power output 70 in response to the second sharing regulator 62. The power outputs 68, 70 can be respectively provided to the common DC electrical bus 80.

The variable frequency power output of each generator 48, 50 can be selected in response to its respective sharing regulator 60, 62 according to the embodiment of invention. Depending on the type of electrical load 82 drawing power, the DC power extracted by the system architecture 40 may undergo further processing before being used by the load 82.

Figure 3:
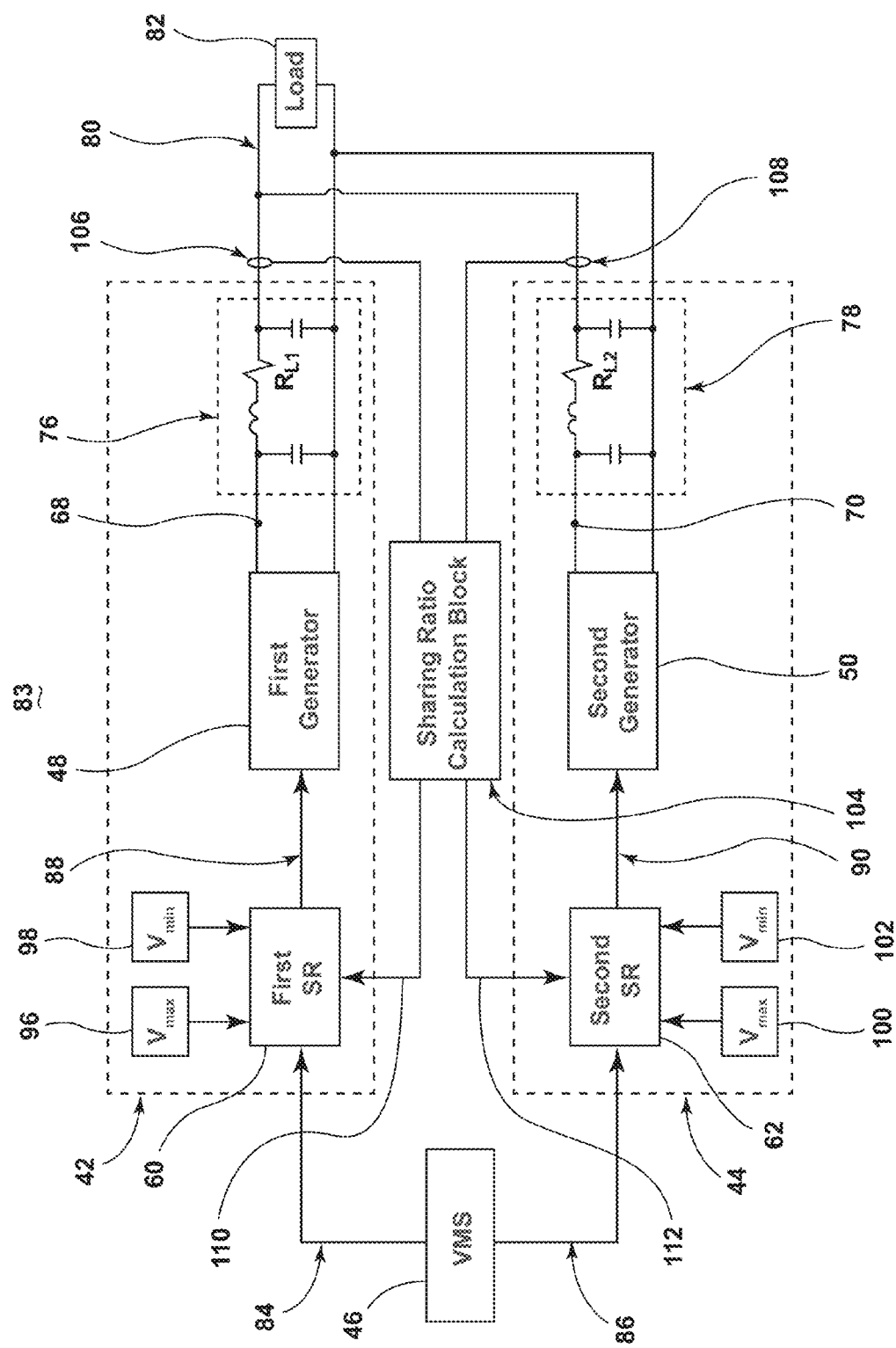
FIG. 3 is an electrical diagram of the generators with the circuit for allocating power among the two generators of FIG. 2.

FIG. 3 is a control circuit diagram 83 in the system architecture 40 of FIG. 2 for allocating power among the generators 48, 50. The VMS 46 generates first and second share commands 84, 86 which are transmitted to the first sharing regulator 60 and to the second sharing regulator 62, respectively. The first and second share commands 84, 86 are digital signals representing the allocation of the desired power ratio to be supplied by each of the first and second generators 48, 50, respectively. The summation of the share commands 84, 86 represents the full desired power load for the system architecture 40. Thus, the share commands 84, 86 may be any value between (and including) 0 and 1 representing the ratio of load handled by each generator versus total load, such that the summation of the share commands 84, 86 equals 1.0. Alternate share command values and ranges are envisioned. If there are more than two generators whose power is to be allocated, then each share command may be a fraction of 1, so long as the summation of all share commands equals 1.

The first filter 76 of first generator system 42 is further illustrated as a CLC filter, typically used to prevent the transmission of inherent switching harmonics produced by the first generator 48 from reaching the electrical load 82. Similarly, the second filter 78 of second generator system 44 is illustrated as a CLC filter, typically used to prevent the transmission of inherent switching harmonics produced by the second generator 50 from reaching the electrical load 82. Each of the filters 76, 78 has an inherent parasitic resistance $R_{L1}$, $R_{L2}$. A non-limiting example of a typical inductance for the filters 76, 78 is 10 µH. A non-limiting example of a typical parasitic resistance for $R_{L1}$ and $R_{L2}$ is 10 milliohms. A non-limiting example of a typical capacitance for the filters 76, 78 is 100 µF.

The first generator system 42 further comprises a first voltage reference 88, transmitted from the first sharing regulator 60 to the first generator 48, and a first regulation voltage, measured at the first generator power output 68 and transmitted to the first generator 48.

The second generator system 44 further comprises a second voltage reference 90, transmitted from the second sharing regulator 62 to the second generator 50, and a second regulation voltage, measured at the second generator power output 70 and transmitted to the second generator 50.

Each generator 48, 50 is further configured to operate by generating a matching DC output voltage at the DC power output 68, 70 in response to the supplied voltage reference 88, 90. For example, a first voltage reference 88 of 271 VDC transmitted to the first generator 48 causes the generator to produce rectified DC power at 271 VDC, as measured at the first DC power output 68. Each generator 48, 50 may control the DC output voltage by a plurality of means, including providing the voltage reference 88, 90 as means of generator excitation, or additionally by providing active rectification at each rectifier device 72, 74, in response to the voltage reference 88, 90. Alternate means of altering the power output of each generator in response to the voltage reference 88, 90 are envisioned. Furthermore, each generator may comprise a controller (not shown) to compare each respective voltage reference 88, 90 to each respective regulation voltage. In this example, each generator controller, residing in each generator 48, 50, could drive each respective generator to match the regulation voltage to each voltage reference 88, 90.

The first sharing regulator 60 further comprises electrical coupling to a first maximum reference voltage 96 and a first minimum reference voltage 98. The first maximum and minimum reference voltages 96, 98 define the limits of the first voltage reference 88. The first maximum and minimum reference voltages 96, 98 are determined in accordance with the parasitic resistance $R_{L1}$ and the desired operating characteristics of the system architecture 40, and will be explained in greater detail below. Once the first maximum and minimum reference voltages 96, 98 are determined, they remain static for those particular electrical system characteristics.

The second sharing regulator 62 further comprises electrical coupling to a second maximum reference voltage 100 and a second minimum reference voltage 102. The second maximum and minimum reference voltages 100, 102 define the limits of the second voltage reference 90. The second maximum and minimum reference voltages 100, 102 are determined in accordance with the parasitic resistance $R_{L2}$ and the desired operating characteristics of the system architecture 40, and will be explained in greater detail below. Once the first maximum and minimum reference voltages 100, 102 are determined, they remain static for those particular electrical system characteristics.

The system architecture 40 further comprises a current feedback loop, illustrated as a sharing ratio calculation block 104, for measuring the ratio of current provided by each generator 48, 50, and providing that ratio to each respective sharing regulator 60, 62. As illustrated, a first current measurement 106 is positioned at the output of the first filter 76 and a second current measurement 108 is positioned at the output of the second filter 78. The sharing ratio calculation block 104 adds each of the current measurements 106, 108 and calculates a ratio of total current provided by each generator 48, 50 using the following equations:

$$Ratio_1 = \frac{I_1}{I_1 + I_2}$$

and $$Ratio_2 = \frac{I_2}{I_1 + I_2},$$

where $Ratio_1$ and $Ratio_2$ are the respective first and second current ratio feedback loop values for the first and second generators 48, 50, and $I_1$ and $I_2$ are the measured current values at the respective first and second current measurements 106, 108.

The maximum reference voltages 96, 100 and minimum reference voltages 98, 102 are determined in accordance with the parasitic resistances $R_{L1}$, $R_{L2}$ and the desired operating characteristics of the system architecture 40. The maximum and minimum reference voltages 96, 98, 100, 102 are preferably based on the expected current draw of the electrical load 80. For instance, in one embodiment of the invention, the electrical load 80 requires 200 A. Also in this instance, the first and second generator systems 42, 44 are alike and are expected to produce 270 VDC at the common DC electrical bus 80 (as per MIL-STD-704 aircraft electrical power characteristic requirements). Similarly, both parasitic resistances are alike, and measured at 10 milliohms each.

In this example, the first maximum and first minimum reference voltages 96, 98 are limited by the range of maximum and minimum power production needed, as determined by the first share command 84. When the first share command 84 requires the first generator system 42 to produce 100% of the 200 A, there will consequently be a 2 V drop over first parasitic resistor $R_{L1}$ (voltage drop=current*resistance; $V_{RL1}$=200 A*0.010 ohms=2 V). Adding this first parasitic resistor voltage drop to the expected 270 V at the common DC electrical bus 80, and the first maximum reference voltage 96 is 272 V in this system example. Similarly, the alike electrical characteristics will lead to the same second maximum reference voltage 100 in the second generator system 44.

Likewise, the first minimal reference voltage 98 is determined using the minimum power production needed, in accordance with the electrical characteristics of the first generator system. When the first share command 84 requires the first generator system 42 to supply 0% of the 200 A, there will consequently be a 0 V drop over the first parasitic resistor $R_{L1}$ (voltage drop=current*resistance; $V_{R1}$=0 A*0.010 ohms=0 V). Adding this first parasitic resistor voltage drop to the expected 270 V at the common DC electrical bus 80, and the first minimum reference voltage 98 is 270 V in this system example. Similarly, the alike electrical characteristics will lead to the same second minimum reference voltage 102 in the second generator system 44.

The resulting maximum and minimum reference voltages 96, 98, 100, 102 of 272 V and 270 V are well within the DC normal operation characteristic requirements of the MIL-STD-704 specification.

The electrical operation of this embodiment of the invention will now be described in further detail. During operation of the gas turbine engine 10, the VMS 46 generates a first share command 84 and a second share command 86 signal, transmitted to the respective first and second share regulators 60, 62, based on the desired power allocation between the respective two generators 48, 50. The desired power allocation may be determined by manual input, a software algorithm, expected operating characteristics of the gas turbine engine 10, etc.

Each share regulator 60, 62 receives the respective share command 84, 86 and determines a voltage reference 88, 90 to transmit to each respective generator 48, 50, which in turn, alters its respective DC power output. The determination of the respective voltage reference 88, 90 to transmit to each generator 48, 50 may be calculated during operation by each respective sharing regulator 60, 62, or alternatively, it may be referenced from known data, such as a lookup table.

Each generator system 42, 44 further operates by confirming the desired share allocation in the sharing ratio calculation block 104. The sharing ratio calculation block 104 reads the current measurements 106, 108, and determines the current ratio provided by each generator 48, 50. The sharing ratio calculation block 104 then transmits each respective current ratio feedback value 110, 112 to each respective sharing regulator 60, 62, to confirm the actual allocation of each generator power output aligns with the desired allocation of each generator power output (as signaled by each respective share command 84, 86). For instance, a first share command 84 digital signal of 0.6, representing a desired first generator power allocation of 60% of the supplied common DC electrical bus 80 current, is confirmed if the sharing ratio calculation block 104 determines the first generator 48 is supplying a current ratio feedback value 110 of 0.6 or 60%. It should be noted the current ratio feedback values 110, 112 may not necessarily represent the same values as the share command 84, 86 signals.

During transient moments where the current ratio feedback values 110, 112 do not confirm the desired power allocation of the respective generator systems 42, 44, the respective sharing regulator 60, 62 may further alter the voltage reference 88, 90, by raising or lowering the voltage, in order to modify the power output of the respective generator.

In one embodiment of the invention, using the same electrical characteristics and requirements mentioned above, a first share command 84 of 60% of the desired power allocation, or 0.6, is transmitted to the first sharing regulator 60, and a second share command 86 of 40% of the desired power allocation, or 0.4, is transmitted to the second sharing regulator 62. Each sharing regulator calculates the respective voltage reference 88, 90 required as follows:

Current supplied by first generator: 60% of 200 A=120 A
Current supplied by second generator: 40% of 200 A=80 A
Reference voltage required: common DC electrical bus voltage+expected voltage drop over parasitic resistance
First reference voltage: 270 V+(120 A*0.01 ohms)=271.2 V
Second reference voltage: 270 V+(80 A*0.01 ohms)= 270.8 V Each generator 48, 50 responds to the respective voltages reference 88, 90 by producing 271.2 V and 270.8 V, respectively, at the DC power outputs 68, 70.

In this example, the current feedback loop will measure 120 A at the first current measurement 106 and 80 A at the second current measurement 108. The first current ratio feedback value 110 will be calculated to be 0.6, and the second current ratio feedback value 112 will be calculated to be 0.4. These respective current ratio feedback values 110, 112 will confirm the desired power allocations of the share commands 84, 86.

Many other possible embodiments and configurations in addition to that shown in the above figures are contemplated by the present disclosure. For example, in another embodiment of the invention, the desired power allocation, as determined by manual input, a software algorithm, expected operating characteristics of the gas turbine engine 10, etc., may only represent a first share command 84. In this embodiment, the second share command 86 may be calculated by the VMS 46 to be the remaining power allocation, such that the summation of the total power allocation equals 100%.

In yet another embodiment of the invention, where more than two generator systems are used in parallel for desired power allocation, a share command must be determined by manual input, a software algorithm, expected operating characteristics of the gas turbine engine 10, etc., for at least the total number of parallel generator systems minus one, with the VMS 46 calculating the remaining power allocation, such that the summation of the total power allocation equals 100%.

In a further embodiment of the invention, the generator systems 42, 44 may be DC generators without the need to rectify an AC power output.

The embodiments disclosed herein provide a circuit for allocating power between turbine engine generators. One advantage that may be realized in the above embodiments is that the above described embodiments have superior weight and size advantages over the conventional type turbine generator systems. With the proposed allocation between parallel configured generators, a high power output can be achieved without the need for a single larger generator or larger mechanical driving force.

Another advantage that may be realized in the practice of some embodiments of the described systems and methods is that DC power can be extracted from both spools 26, 28 of a gas turbine engine 10. The operating efficiency of the gas turbine engine 10 is also increased by seamlessly controlling the power drawn from HP and LP spools 26, 28.

Another advantage that may be realized in the practice of some embodiments of the described systems and methods is that the system architecture(s) can offer a level of redundant DC power generation, since DC power can be extracted from the LP spool 28 as well as the HP spool 26 of the gas turbine engine 10. Drawing power from both spools 26, 28 offers increased redundancy for DC power, such that in the event of a failure of one of the spools 26, 28 or generators 42, 44, DC power may still be extracted from the remaining operational spool 26, 28 and generator 42, 44.

Still another advantage that may be realized in the practice of some embodiments of the described systems and methods is the avoidance of engine stall issues that are typically encountered during a descend mode of the aircraft by sharing the DC load between the HP and LP spools 26, 28. Being able to draw power from the LP spool as well as the HP spool permits allows the aircraft to run at lower rpms during descent without risk of stall, thereby preserving fuel efficiency of the aircraft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A circuit for allocating power among at least two generators to a single load on a shared DC bus, the circuit comprising:
    a first generator and a second generator electrically parallel to each other;
    a first sharing regulator serially connected to the first generator and a second sharing regulator serially connected to the second generator;
    a first filter serially connected between a first generator output and the DC bus and a second filter serially connected between a second generator output and the DC bus;
    a digital input to each of the first and second sharing regulators including a share command, wherein the share command provides a desired unequal power ratio to be supplied by the first and second generators;
    a first current feedback loop between an output of the first filter and an input of the first sharing regulator; and
    a second current feedback loop between an output of the second filter and an input of the second sharing regulator;
    wherein the share command at the digital input and current in the first and second current feedback loops will cause the first and second sharing regulators to independently alter the power of the first generator at the first generator output and the second generator at the second generator output, thereby allocating the load on the DC bus according to the power ratio of the share command.

2. The circuit according to claim 1 wherein each of the sharing regulators has a maximum reference voltage and a minimum reference voltage.

3. The circuit according to claim 2 wherein each of the filters comprises an inductor having a parasitic resistance.

4. The circuit according to claim 3 wherein each of the first and second sharing regulator maximum and minimum reference voltages is determined based upon the respective parasitic resistance.

5. The circuit according to claim 1 wherein the at least one of the first and second filters is a CLC filter.

6. The circuit according to claim 1 wherein each generator comprises a controller.

7. The circuit according to claim 6 wherein each of the first and second sharing regulators operate the respective generator by sending a reference voltage to the respective generator.

8. The circuit according to claim 7 wherein the operation of each of the first and second generators comprises the respective controller responding to respective reference voltage.

9. The circuit according to claim 1 wherein each generator is mechanically connected to a spool in a turbine engine.

10. The circuit according to claim 9 wherein at least one of the first and second generators is mechanically connected to a high pressure spool in a turbine engine.

11. The circuit according to claim 9 wherein at least one of the first and second generators is mechanically connected to a low pressure spool in a turbine engine.

12. The circuit according to claim 1 wherein the sum of the values of the digital inputs represents the full load.

13. A method for allocating power among at least two generators to a single load on a shared DC bus, the method comprising:
    providing a sharing regulator and a current feedback loop for each of the at least two generators;
    generating a digital input to each sharing regulator wherein the digital input represents a selected unequal power allocation among the at least two generators;
    sending a reference voltage signal from each sharing regulator to a respective one of the at least two generators, to independently alter the power at the output of each generator according to the selected unequal power allocation; and
    confirming the unequal power allocation of power at the outputs, by way of current, in the respective current feedback loop.

14. The method according to claim 13 wherein providing a reference voltage comprises establishing a maximum and minimum reference voltage for each sharing regulator.

15. The method according to claim 14 further comprising sending a point of regulation voltage at the output to each generator wherein the point of regulation voltage is measured before any filtering of the output.

16. The method according to claim 14 wherein establishing the maximum and minimum reference voltage is based on the electrical characteristics of the filter.

17. The method according to claim 13 wherein the sum of the values of the digital inputs represents the full load.

\* \* \* \* \*

UNITED STATES PATENT AND TRADEMARK OFFICE
CERTIFICATE OF CORRECTION

PATENT NO. : 9,257,838 B2  
APPLICATION NO. : 13/716426  
DATED : February 9, 2016  
INVENTOR(S) : Gataric et al.

It is certified that error appears in the above-identified patent and that said Letters Patent is hereby corrected as shown below:

In the Specification

In Column 6, Lines 30-31, delete "electrical load 80." and insert -- electrical load 82. --, therefor.

In Column 6, Line 32, delete "electrical load 80" and insert -- electrical load 82 --, therefor.

In Column 6, Line 57, delete "$V_{R1}$" and insert -- $V_{RL1}$ --, therefor.

Signed and Sealed this  
Nineteenth Day of July, 2016

Michelle K. Lee  
*Director of the United States Patent and Trademark Office*